United States Patent Office 3,254,023
Patented May 31, 1966

3,254,023
METHOD OF HEAT BALANCING IN ORGANIC CATALYTIC REACTIONS
Joseph N. Miale, Trenton, N.J., and Paul B. Weisz, Media, Pa., assignors to Socony Mobil Oil Company, Inc., a corporation of New York
No Drawing. Filed June 8, 1964, Ser. No. 373,485.
24 Claims. (Cl. 208—120)

This application is a continuation-in-part of our application Serial No. 39,868 filed June 30, 1960, now Patent No. 3,136,713.

This invention relates to a method of carrying out an exothermic reaction and an endothermic reaction in a single reaction zone wherein the heat evolved in the exothermic reaction is utilized to effect the endothermic reaction. More particularly, this invention relates to an exothermic addition reaction with a fluid charge containing components capable of undergoing exothermic addition and a catalyst for such exothermic addition reaction, and to the utilization of the heat evolved from the foregoing exothermic addition reaction to effect a desired endothermic reaction.

In our application Serial No. 39,868 filed June 30, 1960, there is described a method for internally heating a catalytic reaction zone wherein an endothermic reaction such as catalytic cracking of a fluid charge is carried out, which method involves introducing into the reaction zone, along with the fluid charge being subjected to cracking and the cracking catalyst, a combustible fuel component, oxidant therefor, and a crystalline aluminosilicate having rigid three dimensional networks bearing within the interior thereof catalytic oxidation surfaces and having uniform interstitial dimensions which are sufficiently large to admit the oxidant and the fuel component, but are sufficiently small to exclude the fluid charge which is to be subjected to cracking, so that the fuel component is contacted with the catalytic oxidation surfaces and combusted, to thereby raise the temperature of the reaction zone sufficiently high to effect catalytic cracking of the fluid charge. Thus, our foregoing application discloses an exothermic reaction, combustion, and an endothermic reaction, cracking of a fluid charge, wherein the heat evolved in the exothermic reaction is utilized to effect the endothermic reaction.

We have now discovered that exothermic reactions other than combustion can be carried out to evolve heat, which heat can be utilized to effect a desired endothermic reaction. We have additionally discovered that endothermic reactions other than cracking can be maintained by the heat evolved from the exothermic reaction.

In accordance with our invention, a method is provided for effecting an exothermic reaction and an endothermic reaction in a single reaction zone, which method comprises introducing into the reaction zone a fluid charge capable of undergoing an endothermic reaction, a catalyst for such endothermic reaction, a fluid charge containing components capable of undergoing exothermic addition reaction, and a catalyst for such exothermic addition reaction, and regulating the proportions of the foregoing charges such that the heat evolved from the exothermic addition reaction serves to maintain the reaction zone at a temperature sufficient to sustain the endothermic reaction.

By the expression "exothermic addition reaction" we mean a reaction which is accompanied by the evolution of heat wherein the number of reacting molecules *exceeds* the number of molecules produced by the reaction.

Thus, in accordance with one aspect of our invention, for the exothermic addition reaction there is employed a fluid charge having carbon-carbon unsaturation, a reactant capable of adding to such carbon-carbon unsaturation, and an addition catalyst.

The carbon-carbon unsaturation present in the fluid charge may be of the ethylenic type, $>C=<$, of the acetylenic type, $—C\equiv C—$, or of the aromatic type. Thus, compounds exhibiting such carbon-carbon unsaturation include aromatics such as benzene, naphthalene and the like, unsaturated hydroaromatics such cycloalkenes, and unsaturated aliphatics defined by the formulas of $R_1C\equiv CR_2$ and $R_1CH_2=CH_2R_2$ wherein $R_1$ and $R_2$ are selected from the group consisting of hydrogen, alkyl, cycloalkyl, alkenyl, cycloalkenyl, alkinyl, aryl, alkaryl and aralkyl. Of course, any of the foregoing compounds containing carbon-carbon unsaturation may also contain one or more substituents, such substituents being any that do not interfere with the addition reaction at the carbon-carbon unsaturation and also do not interfere with the particular endothermic reaction that is being contemporaneously carried out in the reaction zone.

The specific reactant employed to effect an addition reaction at the carbon-carbon unsaturation present in the fluid charge may, of course, vary, depending upon the particular nature of addition reaction. Suitable addition reactants include hydrogen, wherein the addition constitutes a hydrogenation; a halogen, wherein the addition constitutes a halogenation; ammonia, wherein the addition constitutes an amination; a hydrogen halide, wherein the addition constitutes a hydrohalogenation; water, wherein the addition is a hydration; hydrogen sulfide, wherein the addition constitutes a hydrosulfurization; carbon monoxide and water, wherein the addition constitutes a carboxylation; carbon monoxide and hydrogen wherein the addition constitutes a hydroformylation type synthesis; an alkylating agent such as an alkane wherein the addition constitutes an alkylation; an unsaturated monomer wherein the addition is a polymerization reaction; etc.

All of the foregoing addition reactions are exothermic in nature, and the heat evolved therefrom can be utilized to effect a desired endothermic reaction.

In accordance with another aspect of our invention, the exothermic addition reaction may comprise a Fischer-Tropsch type of synthesis reaction. Such synthesis reaction is characterized by the fact that the number of molecules formed as the reaction products is always less than the number of molecules present as the initial reactants.

In accordance with this aspect of our invention, a method is provided for effecting an exothermic addition reaction and an endothermic reaction in a reaction zone, whch method comprises introducing into the reaction zone a fluid charge capable of undergoing an endothermic reaction, a catalyst therefor, a fluid charge containing as components thereof carbon monoxide and hydrogen, these components being capable of undergoing an exothermic synthesis addition reaction of the Fischer-Tropsch type, and a catalyst for such exothermic reaction, and regulating the proportions of the foregoing charges such that the heat evolved from the exothermic reaction serves to maintain the reaction zone at a temperature sufficient to effect the endothermic reaction.

The exothermic synthesis addition reaction of the Fischer-Tropsch type may be represented by the following reactions:

(A)
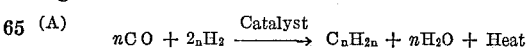

(B)
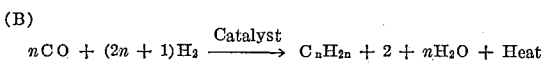

Thus, the synthesis reaction may be utilized to obtain unsaturated and/or saturated aliphatics.

Generally the foregoing synthesis reaction will result in a complex mixture of aliphatic hydrocarbons, both saturated and unsaturated, with a considerable spread in molecular weight, so that the value of "n" may vary within wide limits, e.g. from 1 to 20 or higher.

The endothermic reaction may comprise cracking, dehydration, dealkylation, dehydrogenation, dehalogenation, dehydrohalogenation, deamination, steam reforming, and the like. Of course, the endothermic reaction must be so selected as to be compatible with the exothermic reaction that is contemporaneously being carried out. Thus, the endothermic and exothermic reactions should not interfere with one another.

Considering the exothermic addition reactions in detail, when such reactions comprise polymerization, hydration, alkylation, hydrosulfurization, or the like, the catalyst employed may be designated an "acid" catalyst. (Polymerization may also be conducted utilizing a "metal" catalyst as discussed hereinafter.) Suitable acid catalysts include silica-metal oxides such as silica-alumina, silica-magnesia, etc.; halogenated aluminas such as fluorine on alumina, chlorine on alumina, etc.; halides of metals from Groups III and IV of the Periodic Table such as aluminum chloride and the like; crystalline aluminosilicate zeolites including hydrogen zeolites, metal hydrogen zeolites such as rare earth X and Y zeolites, rare earth hydrogen X and Y zeolites; and such natural zeolites as erionite, chabazite, offretite, mordenite, etc. Additional zeolites which would be suitable are described in Frilette et al. application Serial No. 161,241, filed December 26, 1961.

Acid catalysts of the crystalline aluminosilicate zeolite type are characterized by pores having a substantially uniform pore diameter. If this pore diameter is of a certain magnitude, e.g., 5 angstrom units, then the catalyst will exhibit "shape selectivity" in that it will permit entry to tis interior of straight chain (linear) molecules but will exclude branched molecules.

In order to introduce hydrogen into such a zeolite without destroying the characteristic pore structure, it has been found that the atomic ratio of silicon to aluminum in the zeolite should preferably be greater than about 1.8, and preferably in excess of 2.5. Thus, erionite and chabazite each contain pores of a uniform pore diameter of 5 angstrom units. Erionite, however, has an atomic ratio of silicon to aluminum equal to 3.0, whereas for chabazite the ratio is 2.0. Hydrogen can be introduced into either of these zeolites. Thus, hydrogen erionite can be obtained by direct base exchange of erionite with an aqueous acid such as HCl because of the relatively high atomic ratio of 3.0. Hydrogen chabazite can also be obtained, but because of its lower atomic ratio of 2.0 it is preferable to first exchange the chabazite with aqueous ammonium chloride solution to introduce ammonium ions, followed by heating to drive off ammonia, rather than to exchange directly with an acid. (The effect of the silicon-aluminum atomic ratio in a given zeolite upon the ease of introduction of hydrogen ions thereto is discussed in detail in Plank et al. application Serial No. 235,141 filed November 2, 1962.)

When the exothermic addition reaction constitutes a hydrogenation, hydration, halogenation, hydroformylation synthesis, Fischer-Tropsch type synthesis, or the like, the catalyst employed may be designated a "metal catalyst." By the expression "metal catalyst" we mean to include those metals and metal compounds wherein the metal is a transition metal selected from Groups V–VIII of the Periodic Table, periods 4–6. Included among such transition metals are vanadium, chromium, manganese, iron, cobalt, nickel, platinum and palladium metals, and tungsten.

The metal catalyst may be in the form of free metal such as nickel powder, platinum sponge, or the like, or as a powdered metal compound such as partially reduced iron oxides. Frequently the metal catalyst is impregnated upon a carrier such as silica, alumina, pumice, clay, asbestos, etc. Where the metal catalyst is employed in the form of a metal compound rather than free metal it may be an oxide, or a salt such as a sulfide, chromite, tungstate, etc.

As will be apparent from certain of the examples hereinafter, in many instances it is desirable that the metal catalyst be shape selective. Shape selectivity is generally achieved by selecting an appropriate crystalline aluminosilicate zeolite and introducing the desired metal therein by whatever technique is most suitable, e.g., impregnation, ion exchange, or "growing" the crystalline zeolite in the presence of the metal. This latter technique involves introducing into a mixture of components capable of forming a crystalline aluminosilicate zeolite a minor proportion of the desired metal or metal ions and thereafter growing the crystalline zeolite to thereby "trap" the metal therewithin. This latter procedure is described in detail in Frilette et al. application Serial No. 316,369 filed October 29, 1963.

When the exothermic addition reaction constitutes hydrohalogenation, hydrosulfurization, amination or the like, the catalyst employed may be designated an "alkaline" catalyst. Typical alkaline catalysts are alkali metal compounds such as an alkali metal oxide, hydroxide, or salt of a weak acid. Where shape selectivity is desired, this is obtained by incorporating the alkaline catalyst in a crystalline aluminosilicate zeolite having pores of the requisite "selective" pore diameter. The techniques employed to effect such incorporation include the same as those previously described with respect to "metal" catalysts.

Then the exothermic addition reaction is a hydrogenation, the initial reactant may be an aromatic such as benzene or an unsatruated hydroaromatic such as cyclohexene. Alternatively, the reactant may be an unsaturated aliphatic, in which case the hydrogenation reaction may generally be represented as follows (wherein $R_1$ and $R_2$ are as previously defined):

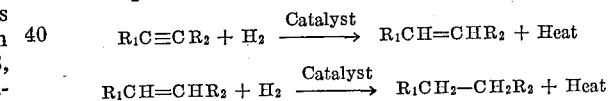

The hydrogenation is generally carried out at a temperature of from about 0° to 600° C. and at a pressure of from about atmospheric to 2000 p.s.i. or even higher. A more preferred temperature range is from about 0 to 550° C.

When the addition reaction is an amination, then ammonia is employed as the reactant which adds to the fluid charge at its carbon-carbon unsaturation, with one hydrogen going to one of the unsaturated carbons and the —$NH_2$ group to the other.

The amination can be carried out at a temperature of from about zero to 300° C. and at atmospheric or elevated pressure, preferably pressures of from about 500 to 4000 p.s.i.

When the exothermic addition reaction is a hydration, one molecule of water adds to the carbon-carbon unsaturation. The hydration is desirably carried out at a temperature of from about zero to 200° C. and at a pressure of from about 500 to 4000 p.s.i. although higher pressures may be employed.

To effect a hydroformylation synthesis as the exothermic addition reaction, carbon monoxide and hydrogen are desirably employed as the reactant mixture. Such mixture is capable, under the particular reaction conditions employed, of providing a hydrogen and the formyl group, —CHO, with the hydrogen going to one of the unsaturated carbons and the —CHO group going to the other. The hydroformylation reaction generally may be represented as follows:

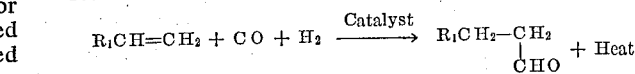

The hydroformylation is desirably carried out at a temperature of from about zero to 350° C. and at atmospheric pressure, although higher pressures may be employed.

If desired, two moles of hydrogen may be employed per mole of carbon monoxide so as to hydrogenate the aldehyde and result in the formation of an alcohol.

When the exothermic addition reaction constitutes an alkylation, a suitable alkylating agent such as an isoalkane or aromatic is employed as the reactant, whereby one hydrogen therefrom goes to one of the unsaturated carbons and the residual radical goes to the other. The reaction is generally carried out at a temperature at from about zero to 300° C. and at atmospheric pressure, although higher pressures may be utilized.

Where the exothermic addition reaction is a polymerization reaction then, of course, the reactant which adds to the carbon-carbon unsaturation present in the fluid charge is itself an unsaturated monomer capable of polymerizing by the opening of such unsaturation. The monomer may be the same as that present in the fluid charge in which case a homopolymerization is effected, or it may be different therefrom whereby a copolymerization results. The particular reaction conditions as to temperature and pressure are also dependent upon the specific polymerization reaction being conducted. In general, however, the temperature should be from about zero to 300° C. and the pressure about atmospheric, although higher pressures may be employed.

Where the exothermic addition constitutes a synthesis reaction of the Fischer-Tropsch type, it is generally carried out at a temperature of from about zero to 350° C. and at amtospheric pressure, although higher pressures may be employed.

The endothermic reaction which is sustained by virtue of the heat evolved from any of the foregoing exothermic reactions must, of course, be one that does not interfere with the exothermic reaction and which is itself not adversely affected by the exothermic reaction. Suitable endothermic reactions include cracking, dehydration, dealkylation, dehydrogenation, dehalogenation, dehydrohalogenation, reforming (including steam reforming), and the like.

It will be apparent that many of the foregoing endothermic reactions represent the converse of the various exithermic addition reactions previously described. In general, the exothermic and endothermic reactions which are to be carried out in the same reaction zone should be so selected that they are not the converse of one another. For example, where the exothermic addition reaction constitutes hydrogenation of an olefin, the endothermic reaction usually should not be dehydrogenation of a paraffin to an olefin.

It also will be apparent that the temperature at which the single reaction zone is maintained must be one wherein both the exothermic reaction and the endothermic reaction will proceed.

Considering the various endothermic reactions, the following temperature ranges are generally satisfactory: for dehydration, from about 100 to 600+° C.; for dehydrogenation, from about 400 to 600+° C.; for dehalogenation and dehydrohalogenation, from about 200 to 600+° C.; for cracking (which also includes deamination and dealkylation), from about 200 to 600+° C.; for steam deforming (which is the converse of both hydroformylation and the Fischer-Tropsch type synthesis), from about 300 to 600+° C.

As previously noted, the exothermic and endothermic reactions which are contemporaneously carried out in the reaction zone must not interfere with one another. This may be accomplished by utilizing two distinct types of catalytic sites, one type for the exothermic reaction and another for the endothermic reaction. The two catalysts exhibiting such distinct catalytic sites may be in the form of a composite granule or may be added as a mixed charge to the reaction zone. In any event, they are in thermal contact with one another. (Neither catalyst need necessarily be "shape selective," as shown by Examples 2, 7, and 9 hereinafter.)

For example, an exothermic hydrogenation of benzene to cyclohexane and an endothermic cracking of a heavy hydrocarbon to lighter hydrocarbon fractions can be carried out simultaneously in the same reaction zone, which zone contains particles of hydrogenation catalyst, e.g., supported platinum, palladium, nickel, molybdena, or the like, along with particles of cracking catalyst. The feed stream contains appropriate amounts of hydrocarbon cracking charge, benzene, and hydrogen. The particle sizes of each catalyst are relatively large, i.e., much greater than 100 microns, so that no hydrocracking results.

Of course, the reaction conditions of temperature and pressure must be such as to permit both reactions to proceed. In the foregoing system, the cracking generally requires relatively high temperatures whereas the hydrogenation occurs at lower temperatures. Both reactions will proceed, however, at a temperature of from about 750 to 850° F. This overlap range can be extended by the use of high pressure, especially by the use of high hydrogen partial pressures.

Naturally, the cracking catalyst must not crack appreciable quantities of benzene or cyclohexane, nor may the cracking catalyst be inhibited by either the hydrogen, benzene or cyclohexane involved in the hydrogenation reaction. Conversely, the hydrogenation catalyst must not be affected by either the heavy hydrocarbon or light hydrocarbons associated with the cracking reaction.

In certain instances, and in accordance with another embodiment of our invention, a shape-selective catalyst is employed for one or both of the reactions. This is illustrated in Examples 1, 3–6, 8, 10, and 11 hereinafter.

For instance, a shape selected hydrogenation catalyst can be employed which will admit only n-aliphatics and hydrogen and will thus effect hydrogenation of n-olefins present in an initial charge which is to be cracked. Such hyrogenation being exothermic, the heat derived therefrom is utilized in carrying out the endothermic cracking reaction.

As already noted, a shape selective catalyst may be obtained by depositing within the pores of a crystalline aluminosilicate structure an appropriate metal or compound thereof capable of catalytically promoting hydrogenation. Deposition of the metal within the crystalline aluminosilicate may be accomplished by growth of the aluminosilicate crystals in a solution containing an ion of such metal. Thus, suitable crystalline inorganic aluminosilicates containing metal distributed within the pores thereof may be produced by effecting the growth of crystals of the aluminosilicate from an aqueous mixture containing a water-soluble ionizable metal compound, dehydrating the resulting metal containing crystalline product and subjecting the same to a thermal treatment at an elevated temperature. The resulting product comprises metal dispersed within the pores of the crystalline aluminosilicate structure characterized by rigid three dimensional networks and an effective pore diameter within the approximate range of about 4 to about 7 Angstroms. An effective crystalline aluminosilicate having a platinum metal distributed within its uniform structure may be prepared, as described in Frilette et al. application Serial No. 319,639, filed November 29, 1963, by introducing into an aqueous reaction solution having a composition, expressed as mixtures of oxides, within the following ranges $SiO_2/Al_2O_3$ of 0.5 to 2.5, $Na_2O/SiO_2$ of 0.8 to 3.0 and $H_2O/Na_2O$ of 35 to 200, a minor proportion of a water-soluble ionizable platinum metal compound, inducing crystallization of the resulting reaction mixture by subjecting the same to hydrothermal treatment, replacing sodium ions of the resulting crystalline product with calcium, dehydrating the material so obtained and thermally treating at a temperature in the approximate range of 250° F. to 1100° F. to effect at least partial conversion of the platinum metal-containing ion to a catalytically active state, thereby yielding a resulting composition having platinum metal dispersed with the pores of a crystalline aluminosilicate characterized by rigid three dimensional networks and uniform pores approximately 5 Angstroms in diameter.

Aside from introducing the metal into the aluminosilicate structure during the process of crystal growth, such metal may be deposited within the interior of the crystalline aluminosilicate by base-exchange of an initially formed alkali metal or alkaline earth metal aluminosilicate with a solution containing an ion of the desired metal. Utilizing this manner of operation, it is generally desirable to remove active catalytic hydrogenation surfaces attributable to deposition of the metal ion on the outer surface of the crystalline aluminosilicate lattice by either of two methods. One method utilizes the effect of additional base-exchange treatment with a solution containing an ion of size too large to enter the cavities, but effective in exchanging catalytically active to catalytically inactive ions in all external locations. Another method relies on contacting the base-exchanged material with a substance capable of poisoning the active ions externally but incapable of reaching and thus effecting the active sites located within the cavities. By whatever method may be employed, the catalytic hydrogenation surface is caused to be contained only within the crystalline pore structure and to thereby afford a resulting product capable of effecting desired selective catalytic hydrogenation.

Crystalline alkali metal and alkaline earth metal aluminosilicates employed in preparation of the metal-containing composites described herein are essentially the dehydrated forms of crystalline natural or synthetic hydrous siliceous zeolites containing varying quantities of alkali or alkaline earth metal and aluminum. The alkali or alkaline earth metal atoms, silicon, aluminum and oxygen in these zeolites are arranged in the form of an aluminosilicate salt in a definite and consistent crystalline pattern. In general, the process for preparing such aluminosilicates involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product, which crystallizes within this hot mixture is separated therefrom and water washed until the water in equilibrium with the zeolite has a pH in the range of 9 to 12 and thereafter is dehydrated by heating. Usually, an alkali metal silicate serves as the source of silica and an alkali metal aluminate as the source of alumina. An alkali metal hydroxide is suitably used as the source of the alkali metal ion, and, in addition, contributes to the regulation of the pH. All reagents are preferably soluble in water. Generally, a sodium aluminosilicate is employed. Preferably, the reaction solution has a composition expressed as mixtures of oxides within the following ranges $SiO_2/Al_2O_3$ of 0.5 to 2.5, $Na_2O/SiO_2$ of 0.8 to 3.0.

The following examples will further illustrate our invention.

*Example 1*

This example utilizes the hydrogenation of an olefin as the exothermic addition reaction, the heat derived therefrom serving to sustain an endothermic cracking reaction.

The olefin employed in the exothermic addition reaction is ethylene. The hydrogenation catalyst is 4A zeolite containing platinum, which catalyst is characterized by pores having a substantially uniform pore diameter of 4 angstrom units. This catalyst is shape selective in that it will admit to its interior ethylene, but will exclude larger molecules such as propylene and higher olefins.

The foregoing catalyst may be prepared by the procedure disclosed in Frilette et al. application Serial No. 319,639, filed October 29, 1963. Thus, 78 grams of sodium aluminate and 113 grams of sodium metasilicate are separately dissolved in 275 ml. portions of water. Platinous amine chloride, $Pt(NH_3)_4Cl_2$, in an amount of 0.55 gram, is dissolved in 70 ml. of water and added to the sodium aluminate solution, which is then mixed with the silicate solution. There results a white precipitate. The mixture is stirred under reflux conditions at a temperature of about 102° C. for 7 hours and filtered. The solid is then washed with water until free of chloride ion, calcined for 2 hours in air at 800° F. and thereafter in hydrogen for 2 hours at 800° F. The crystalline zeolite product has a platinum content of 0.31 percent by weight.

The endothermic cracking reaction utilizes light gas oil as the initial charge. The cracking catalyst is the rare earth form of X-zeolite, steamed at 1300° F. for 16 hours at 15 p.s.i.g.

The reaction system may be illustrated as follows:

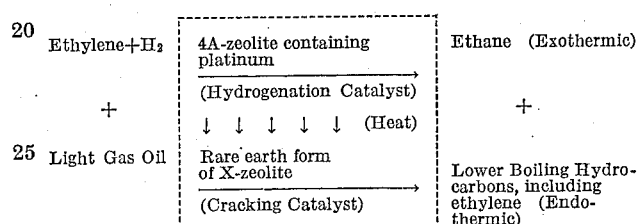

The foregoing reactions are carried out in a single reaction zone containing a mixture of the two types of catalyst particles. The reactions are carried out at a temperature of about 425° C. and at a total pressure of one atmosphere. The liquid hourly space velocity (LHSV) of the light gas oil feed is about 2. Approximately one mole of ethylene is introduced per mole of light gas oil feed. Heat balance between the exothermic and endothermic reactions is maintained by adjustment of the amount of hydrogen feed. Of course, if desired the heat balance may instead be maintained by appropriate regulation of the ethylene feed or the light gas oil feed.

In excess of twenty percent of the light gas oil feed is converted to lower boiling hydrocarbons, including ethylene. Such ethylene may, of course, serve as feed for the exothermic hydrogenation, whereby it will be hydrogenated to ethane. The hydrogenation catalyst, being shape selective, will permit entry of ethylene to its interior but will exclude larger hydrocarbon molecules.

*Example 2*

This example utilizes the hydrogenation of benzene as the exothermic addition reaction, the heat derived therefrom serving to effect an endothermic cracking reaction. The hydrogenation catalyst is a typical platinum reform catalyst, namely, platinum deposited on alumina. (See, e.g., U.S. Patents 2,479,109 and 2,479,110.) The cracking catalyst is a hydrogen Y zeolite (hydrogen faujasite). The charge to be cracked constitutes a petroleum wax ($C_{20}$–$C_{40}$ paraffins).

The reaction system may be illustrated as follows:

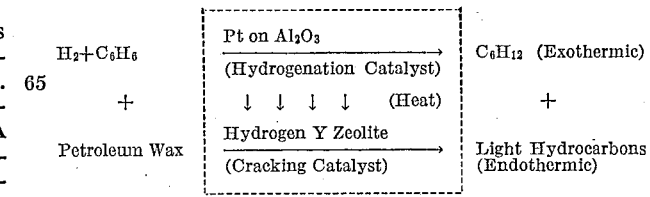

The foregoing reactions are carried out in a single reaction zone containing a mixture of the two types of catalyst particles. The reactions are carried out in the liquid phase at a temperature of 300° C. A liquid mixture containing 10% benzene and 90% petroleum wax is introduced to the reactor. A hydrogen pressure of about 1500 p.s.i. is maintained. The amount of benzene introduced is regulated such that a proper heat balance is maintained whereby the heat evolved from the hydrogenation of benzene to cyclohexane is sufficient to sustain the cracking reaction.

It is found that more than 25 percent of the petroleum wax is cracked to products in the gasoline and distillate fuel range.

It is to be noted that in this example neither of the catalysts is shape selective, yet both the exothermic and endothermic reactions proceed in the same reaction zone without interfering with one another.

*Example 3*

This example is similar to Example 2, but differs in that it utilizes as the cracking catalyst hydrogen erionite rather than hydrogen Y zeolite. The hydrogen erionite is readily obtained by subjecting natural erionite to base exchange with aqueous ammonium chloride solution until nearly all of the cation is exchanged for ammonium ion, then drying and calcining at 600° C. in air for twenty-four hours. The resulting hydrogen erionite is shape selective in that it is characterized by pores having a substantially uniform pore diameter of about 5 angstrom units. Hence, it will permit normal paraffins to enter such pores but will exclude isoparaffins, hydromatics, and aromatics.

The reaction system may be illustrated as follows:

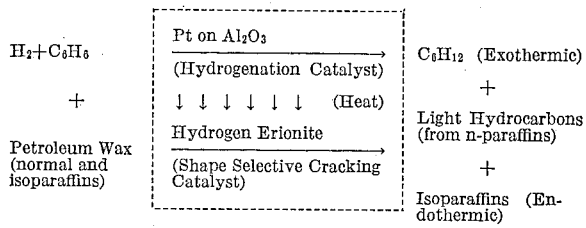

The reaction conditions are the same as those employed in Example 2. The petroleum wax charge contains both normal and isoparaffins. There is obtained a conversion in excess of 20 percent of the normal paraffins to lighter hydrocarbons. The isoparaffins, being excluded from the interior of the hydrogen erionite, are unaffected so that, by virtue of the cracking of the n-paraffins to lighter hydrocarbons, there is a net enrichment in isoparaffins.

It is well known that the properties of waxes depend on the ratio of their isomeric and normal constituents. This example provides a convenient method for modifying the properties of the remaining wax while at the same time converting normal paraffins to desirable lighter hydrocarbon fractions such as hydrocarbon fractions in the jet fuel range.

*Example 4*

This example is similar to Example 3 but illustrates a hydrogenation-dehydrogenation cycle which, in effect, serves as a heat pump.

The liquid product mixture obtained in Example 3 predominantly contains cyclohexane, light hydrocarbons, and isoparaffins. This liquid product is distilled, and that fraction having a boiling point range between about 170 and 180° F. is separated. The bulk of this fraction is cyclohexane. The fraction is sent through a separate reaction zone containing a dehydrogenation catalyst made up of platinum dispersed on alumina. This separate reaction zone is maintained under a hydrogen pressure of about 500 p.s.i. and at a temperature of 880° F. The liquid hourly space velocity of the 170–180° F. fraction is kept at about 4. The cyclohexane in this fraction is thus dehydrogenated, primarily to benzene.

The reaction system may be illustrated as follows:

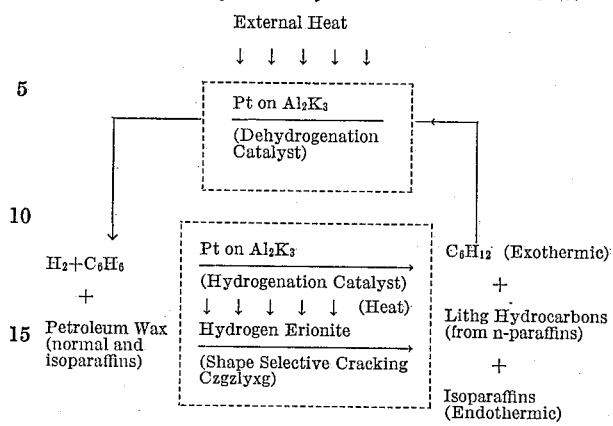

*Example 5*

This example is similar to Example 1, the sole difference being in the utilization of acetylene rather than ethylene as the feed for the exothermic addition reaction. The actylene is hydrognated to form both ethane and ethylene. The endothermic conversion of light gas oil feed to lower boiling hydrocarbons is in excess of twenty percent.

*Example 6*

This example utilizes a Fischer-Tropsch type synthesis as the exothermic addition reaction, the heat derived therefrom serving to effect an endothermic dehydration reaction.

The endothermic dehydration reaction utilizes primary isobutanol, $(CH_3)_2 CHCH_2OH$, as the initial reactant which, under the reaction conditions employed, liberates one molecule of water and forms isobutylene. This reaction is catalyzed by synthetic Y-zeolite, that is, sodium faujasite which has been base exchanged with calcium ions to produce the calcium form. The Y-zeolite is not shape selective.

The exothermic Fischer-Tropsch type synthesis utilizes hydrogen and carbon monoxide as the reactant mixture, the molar ratio being approximately 2:1, respectively. The catalyst for this reaction is a modified A-zeolite. The A-zeolite is well known and is described in U.S. Patent 2,882,243. The A-zeolite is modified to the calcium form by base exchanging with an aqueous solution containing both calcium and nickel ions until the total nickel content is about 8 percent by weight. The resulting catalyst is shape selective in that it is characterized by pores having a substantially uniform pore diameter of 5 angstrom units. Thus, such a catalyst will admit such small molecules as carbon monoxide and hydrogen to its interior but will exclude such larger molecules as isobutanol and isobutylene.

The reaction system may be illustrated as follows:

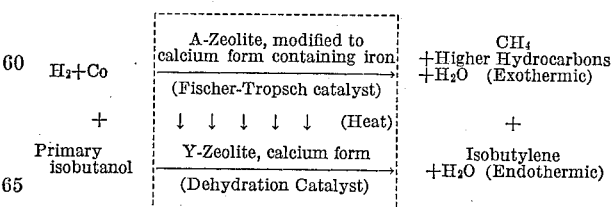

The foregoing reactions are carried out in a single reaction zone at atmospheric pressure and at a temperature of 250° C., with a vapor residence time of about ten seconds. The heat balance between exothermic and endothermic reactions is maintained by appropriate adjustment of the primary isobutanol feed. Greater than 20 percent conversion of the hydrogen and carbon monoxide to methane and higher hydrocarbons is obtained.

Example 7

This example illustrates hydrosulfurization of an olefin as the exothermic addition reaction, the heat derived therefrom serving to sustain an endothermic cracking reaction.

The olefin employed for the hydrosulfurization is propylene, and the catalyst is a sodium X-zeolite. This catalyst is characterized by pores having a substantially uniform pore diameter of 13 angstrom units.

The endothermic reaction utilizes a petroleum wax and a hydrogen Y-zeolite catalyst as described in Example 2.

The reaction system may be illustrated as follows:

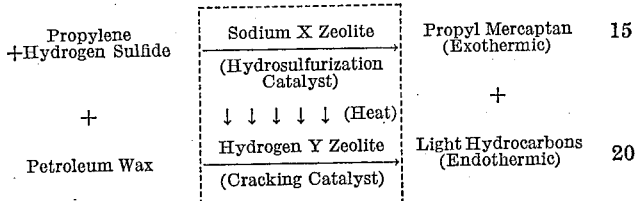

The foregoing reactions are carried out in a single reaction zone containing a mixture of the two types of catalyst particles. The reactions are carried out at atmospheric pressure and at a temperature of about 600° F. The vapor residence time is about 10 seconds. The heat balance is controlled by adjusting the feed of the propylene and/or hydrogen sulfide.

More than 25 percent of the petroleum wax is cracked to products in the distillate fuel and gasoline range.

Example 8

This example illustrates polymerization as the exothermic addition reaction, the heat derived therefrom serving to sustain an endothermic dehydration reaction.

The monomer reactant employed for the polymerization reaction is ethylene. The polymerization catalyst is A-zeolite, modified to the calcium form as described in Example 6.

The endothermic dehydration reaction utilizes tertiary butyl alcohol as the initial reactant. The dehydration catalyst is the calcium X type zeolite and is characterized by pores having a substantially uniform pore diameter of about 10 angstrom units. The dehydration results in the liberation of one molecule of water and the formation of isobutylene.

The reaction system may be illustrated as follows:

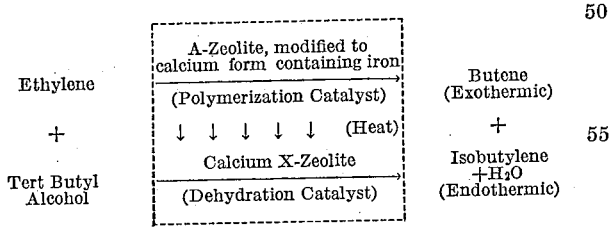

The foregoing reactions are carried out in a single reaction zone containing a mixture of the two types of catalyst particles. The reactions are carried out at atmospheric pressure and at a temperature of about 130° C. The vapor residence time is about 10 seconds. More than 20 percent of the ethylene is dimerized. Similarly, greater than 20 percent of the tertiary butyl alcohol is dehydrated to isobutylene. The proper heat balance is readily maintained by appropriate regulation of the ethylene feed stream and/or the alcohol feed stream.

Example 9

This example illustrates hydrohalogenation of an olefin as the exothermic addition reaction, the heat derived therefrom serving to sustain an endothermic cracking reaction.

The olefin employed is propylene, with the hydrohalogenating agent being HBr. The catalyst for this reaction is sodium Y-zeolite. This catalyst is characterized by pores having a substantially uniform pore diameter of 13 angstrom units.

The charge for the cracking reaction constitutes ethyl benzene. The cracking catalyst is the rare earth form of Y-zeolite, steamed at 1300° F. for 16 hours at 15 p.s.i.g.

The reaction system may be illustrated as follows:

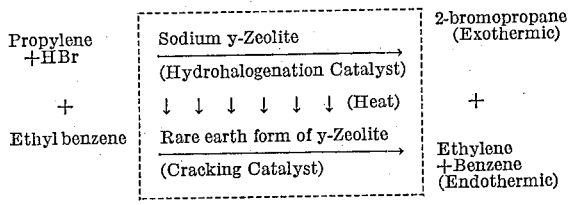

The foregoing reactions are carried out in a single reaction zone containing a mixture of the two types of catalyst particles. The reactions are carried out at atmospheric pressure and at a temperature of 500° F. with a vapor residence time of about 10 seconds. The molar ratio of the feeds ethyl benzene, propylene, and HBr is about 1:1:1. The heat balance is readily controlled by adjustment of the ethyl benzene feed. Conversions in excess of 20 percent are realized.

EXAMPLE 10

This example illustrates hydrogenation as the exothermic addition reaction, the heat derived therefrom serving to sustain an endothermic deamination reaction.

The hydrogenation reaction employs ethylene as the initial reactant. The catalyst for this reaction is a 5 A. type zeolite containing platinum, and is characterized by pores having a substantially uniform pore diameter of 5 angstrom units. This catalyst is shape selective in that it will admit to its interior ethylene, but will exclude branched molecules such as isobutylamine, isobutylene, and the like. The catalyst is readily prepared as described in Example 53 of Frilette et al. application Serial No. 319,639, filed October 29, 1963.

The endothermic deamination reaction employs isobutylamine as the initial reactant. The deamination catalyst is the calcium form of X-zeolite and is characterized by pores having a substantially uniform pore diameter of about 10 angstrom units.

The reaction system may be illustrated as follows:

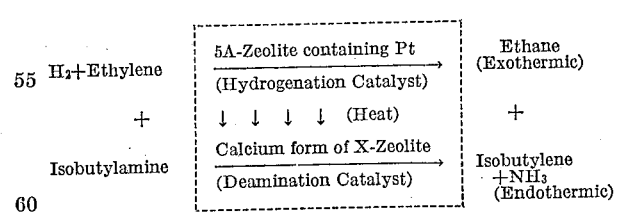

The foregoing reactions are carried out in a single reaction zone containing a mixture of the two types of catalyst particles. The reactions are carried out at atmospheric pressure and at a temperature of 500° F. with a vapor residence time of about ten seconds. Proper heat balance is obtained by regulating the feed of the ethylene but may, of course, also be obtained by adjustment of the $H_2$ feed or the isobutylamine feed.

The conversion of isobutylamine to isobutylene is well in excess of twenty percent.

This reaction system is advantageous in that the $NH_3$ formed by virtue of the deamination reaction aids in preventing the platinum-containing hydrogenation catalyst from forming internal polymers which would tend to deactivate it.

*Example 11*

This example illustrates halogenation as the exothermic addition reaction, the heat derived therefrom serving to sustain an endothermic cracking reaction.

Styrene is utilized as the initial reactant for the exothermic halogenation, with chlorine serving as the halogenating agent. The catalyst is a sodium Y-zeolite and is characterized by pores having a substantially uniform pore diameter of 13 angstrom units.

Normal octane is the initial reactant for the endothermic cracking reaction. The catalyst is hydrogen erionite, prepared as described in Example 3. The hydrogen erionite is shape selective in that it will permit straight chain molecules such as n-octane to enter its interior but will exclude larger molecules such as styrene.

The reaction system may be illustrated as follows:

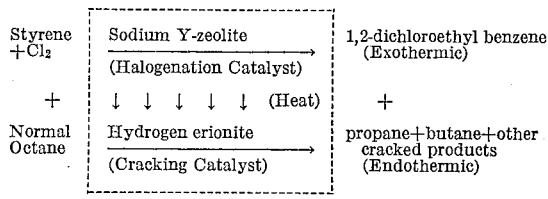

The foregoing reactions are carried out in a single reaction zone at atmospheric pressure and at a temperature of 350° F. with a vapor residence time of about ten seconds.

The conversion of the n-octane to lower boiling cracked products is in excess of twenty percent. The heat balance is maintained by adjustment of the styrene feed, but could equally be maintained by appropriate adjustment of the chlorine or n-octane feeds.

Variations can of course be made without departing from the spirit of our invention as embodied in the foregoing specification.

Having thus described our invention, what we desire to secure and claim by Letters Patent is:

1. A method of simultaneously effecting an exothermic reaction and an endothermic reaction in a single reaction zone, this method comprising introducing into said reaction zone a fluid charge containing an organic reactant capable of undergoing an endothermic reaction, a solid porous catalyst for said endothermic reaction, a fluid charge containing components capable of undergoing an exothermic addition reaction, said components being selected from the group consisting of (1) carbon monoxide and hydrogen and (2) a compound having carbon-carbon unsaturation and a reactant capable of adding to said compound at such carbon-carbon unsaturation, and a solid porous catalyst for such exothermic addition reaction, and regulating the proportions of the foregoing charges such that the heat evolved from said exothermic addition reaction serves to maintain said reaction zone at a temperature sufficient to sustain said endothermic reaction.

2. The method of claim 1 wherein said exothermic addition reaction is a synthesis reaction of the Fischer-Tropsch type, said componentes of said fluid charge capable of undergoing exothermic addition reaction comprising carbon monoxide and hydrogen, whereby the synthesized products resulting from said exothermic addition reaction comprise aliphatic hydrocarbons and water.

3. The method of claim 2 wherein $n$ moles of carbon monoxide are provided and from about $2n$ to $2n+1$ moles of hydrogen, $n$ being a positive integer from about 1 to 20.

4. The method of claim 1 wherein the components of said fluid charge capable of undergoing an exothermic addition reaction comprise a compound having carbon-carbon unsaturation and a reactant capable of adding to said compound at such carbon-carbon unsaturation.

5. The method of claim 4 wherein said compound having carbon-carbon unsaturation is selected from the group consisting of aromatics, unsaturated hydroaromatics, compounds of the formula $R_1C \equiv CR_2$, and compounds of the formula $R_1CH = CHR_2$, wherein $R_1$ and $R_2$ are selected from the group consisting of hydrogen, alkyl, cycloalkyl, alkenyl, cycloalkenyl, alkinyl, aryl, aralkyl, and alkaryl, and wherein said reactant capable of adding to said unsaturation is selected from the group consisting of hydrogen, halogen, ammonia, water, hydrogen sulfide, hydrogen halide, carbon monoxide and water, carbon monoxide and hydrogen, an alkylating agent, and an unsaturated monomer.

6. The method of claim 1 wherein said endothermic reaction constitutes dehydrogenation of a hydrocarbon.

7. The method of claim 1 wherein said endothermic reaction constitutes cracking of a hydrocarbon.

8. The method of claim 1 wherein said endothermic reaction constitutes dehydration of an alcohol.

9. The method of claim 1 wherein said endothermic reaction constitutes dealkylation of a hydrocarbon.

10. The method of claim 1 wherein said endothermic reaction constitutes dehalogenation of a halogenated hydrocarbon.

11. The method of claim 1 wherein said endothermic reaction constitutes dehydrohalogenation of a halogenated hydrocarbon.

12. The method of claim 1 wherein said catalyst for said exothermic reaction is shape selective so that it excludes from its interior catalytic surface said fluid charge capable of undergoing endothermic reaction while admitting to its interior said components capable of undergoing exothermic addition reaction.

13. The method of claim 1 wherein said catalyst for said endothermic reaction is shape selective so that it excludes from its interior catalytic surface said fluid charge containing components capable of undergoing exothermic addition reaction while admitting to its interior said fluid charge capable of undergoing endothermic reaction.

14. The method of claim 12 wherein said exothermic reaction catalyst is a crystalline aluminosilicate zeolite characterized by pores having a substantially uniform pore diameter not exceeding about 5 angstrom units.

15. The method of claim 14 wherein said exothermic reaction comprises hydrogenation of an olefin.

16. The method of claim 14 wherein said exothermic reaction comprises polymerization of an olefin.

17. The method of claim 14 wherein said exothermic reaction comprises a synthesis reaction of the Fischer-Tropsch type, said components of said fluid charge capable of undergoing exothermic addition reaction comprising carbon monoxide and hydrogen, whereby the synthesized products resulting from said exothermic addition reaction comprise aliphatic hydrocarbons and water.

18. The method of claim 13 wherein said catalyst for said endothermic reaction is crystalline aluminosilicate zeolite characterized by pores having a substantially uniform pore diameter not exceeding about 5 angstrom units.

19. The method of claim 18 wherein said endothermic reaction constitutes cracking of a hydrocarbon charge to lower boiling fractions.

20. The method of claim 4 wherein said exothermic reaction constitutes hydrogenation and said reactant capable of adding to said compound having carbon-carbon unsaturation is hydrogen.

21. The method of claim 4 wherein said exothermic reaction constitutes hydrosulfurization and wherein said reactant capable of adding to said compound having carbon-carbon unsaturation is hydrogen sulfide.

22. The method of claim 4 wherein said exothermic reaction constitutes hydrohalogenation and wherein said reactant capable of adding to said compound having carbon-carbon unsaturation is a hydrogen halide.

23. The method of claim 4 wherein said exothermic reaction constitutes halogenation and wherein said reactant capable of adding to said compound having carbon-carbon unsaturation is a halogen.

24. The method of claim 1 wherein said endothermic reaction constitutes deamination of an aliphatic amine.

References Cited by the Examiner

UNITED STATES PATENTS

| | | | |
|---|---|---|---|
| 1,735,925 | 11/1929 | Jaeger | 260—449 |
| 2,003,941 | 6/1935 | Kahl. | |
| 2,829,113 | 4/1958 | Barry et al. | 252—376 |
| 3,033,778 | 5/1962 | Frilette | 208—120 |
| 3,039,953 | 6/1962 | Eng. | |
| 3,136,713 | 6/1964 | Miale et al. | 208—113 |

OTHER REFERENCES

Archibald et al., Ind. & Eng. Chem., vol. 52, September 1960, pages 745–750.

DELBERT E. GANTZ, *Primary Examiner.*

LEON ZITVER, *Examiner.*

B. HELFIN, ABRAHAM RIMENS, *Assistant Examiners.*